United States Patent [19]
Yamamoto et al.

[11] 3,954,008
[45] May 4, 1976

[54] ULTRASONIC FLOW OR CURRENT METER

[75] Inventors: Miaki Yamamoto; Hidekazu Asada, both of Tokyo; Masaharu Maki, Hachioji, all of Japan

[73] Assignee: Kabushikikaisha Tokyo Keiki, Tokyo, Japan

[22] Filed: June 20, 1974

[21] Appl. No.: 481,175

[30] Foreign Application Priority Data
June 23, 1973 Japan.................................. 48-70983

[52] U.S. Cl............................................... 73/194 A
[51] Int. Cl.[2]............................................. G01F 1/66
[58] Field of Search................................... 73/194 A

[56] References Cited
UNITED STATES PATENTS

| | | | |
|---|---|---|---|
| 3,473,378 | 10/1969 | Yoshiyama et al. | 73/194 A |
| 3,653,259 | 4/1972 | McShane | 73/194 A |

FOREIGN PATENTS OR APPLICATIONS

| | | | |
|---|---|---|---|
| 148,253 | 12/1962 | U.S.S.R. | 73/194 A |

*Primary Examiner*—Charles A. Ruehl
*Attorney, Agent, or Firm*—Hill, Gross, Simpson, Van Santen, Steadman, Chiara & Simpson

[57] ABSTRACT

An ultrasonic flow or current meter is disclosed in which a first ultrasonic sing-around system is connected to a pair of ultrasonic vibrators attached to a pipe through which liquid to be measured flows, a second ultrasonic sing-around system is also connected to the pair of ultrasonic vibrators, and the second ultrasonic sing-around system transmits an ultrasonic pulse in the direction opposite to that of the first ultrasonic sing-around system. In this case, the phases of the ultrasonic pulses from the first and second systems are detected, and the amount of delay of the pulse in one of the systems is controlled by the output signal to be always constant, whereby the velocity of the liquid flowing through the pipe is measured.

1 Claim, 7 Drawing Figures

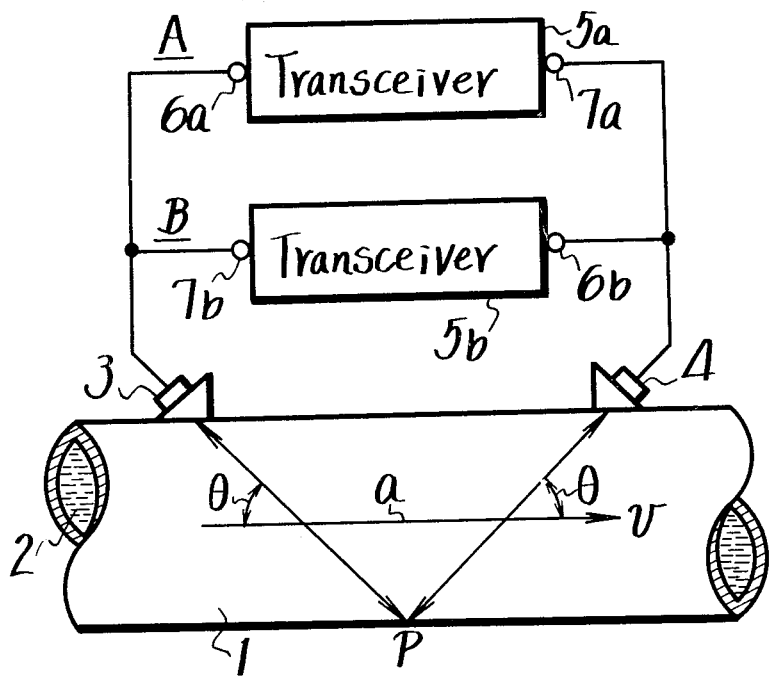
Fig. 1 (PRIOR ART)
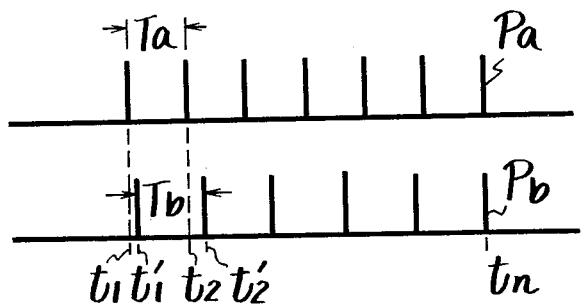
Fig. 2A (PRIOR ART)
Fig. 2B (PRIOR ART)
Fig. 4A
Fig. 4B
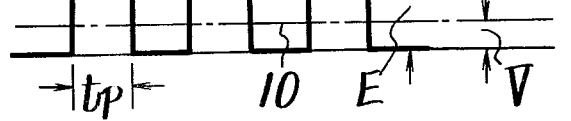
Fig. 4C

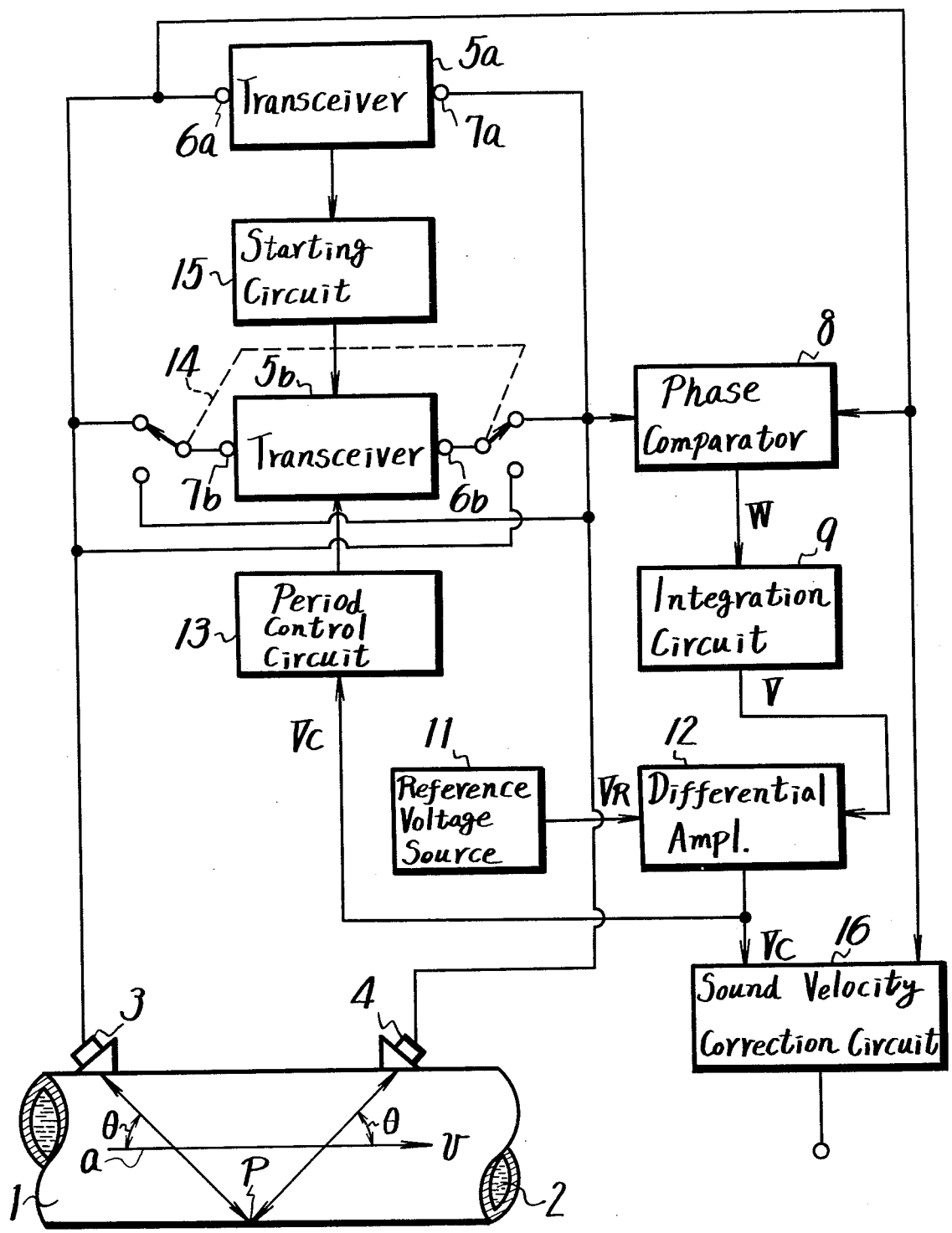

ULTRASONIC FLOW OR CURRENT METER

BACKGROUND OF THE INVENTION

1. Field of the Invention

The present invention relates generally to an ultrasonic flow or current meter and more particularly is directed to a very accurate ultrasonic flow or current meter.

2. Description of the Prior Art

A so-called sing-around method has been already proposed as a flow or current meter employing an ultrasonic wave. The prior art method will be now described with reference to FIGS. 1 and 2. In FIG. 1, reference numeral 1 designates a pipe through which a liquid such as water 2 to be measured flows in a direction shown by an arrow a, and 3 and 4 ultrasonic transducers each of which transmits and receives an ultrasonic signal or pulse (which will be hereinafter referred to as vibrators). The vibrators 3 and 4 are located on the pipe 1 at up- and down-stream sides with respect to the flow direction of the water 2. Ultrasonic sing-around systems A and B are formed of circuits or transceivers 5a and 5b, respectively.

The system A or transceiver 5a transmits a pulse Pa (refer to FIG. 2A) from its output terminal 6a at a time $t_1$ shown in FIG. 2B. The pulse Pa arrives at an input terminal 7a of the transceiver 5a through the vibrator 3 - water 2 - vibrator 4, then is amplified in the transceiver 5a and again transmitted from the output terminal 6a of the transceiver 5a at a time $t_2$ shown in FIG. 2B. This cycle will be repeated thereafter.

The system B is different from the system A in the direction of flow of a pulse Pb. That is, the pulse Pb transmitted from an output terminal 6b of the transceiver 5b at a time $t'_1$ arrives at its input terminal 7b through the vibrator 4 - water 2 - vibrator 3, then is amplified in the transceiver 5b and again transmitted from its output terminal 6b at a time $t'_2$ (refer to FIG. 2B). This cycle will be also repeated thereafter. Thus, reference symbol Ta shown in FIG. 2A represents one period of the pulse Pa, and Tb shown in FIG. 2B one period of the pulse Pb.

The periods Ta and Tb are equal to each other (Ta = Tb) when the water 2 is stopped, while when the water 2 flows or the flow velocity of the water 2 is not zero, the period Ta (forward direction) becomes shorter and the period Tb (backward direction) becomes longer and proportional to the velocity (that is, Ta ≠ Tb). FIGS. 2A and 2B show the latter case.

If it is assumed that the flow velocity of the water 2 in the pipe 1 is taken as $v$ (m/s), the velocity of the ultrasonic pulses Pa and Pb in the water 2 as $c$ (m/s), the distance between the vibrators 3 and 4 along which the ultrasonic pulses propagate as L (m), and the angle between the flow direction $a$ and the propagating direction of the ultrasonic pulse in the water 2 as $\theta$, the periods Ta and Tb can be expressed as follows:

$$Ta = \frac{L}{c + V \cos \theta}$$

$$Tb = \frac{L}{c - v \cos \theta}$$

The repeating frequencies $f_a$ and $f_b$ of the respective pulses Pa and Pb can be expressed as follows:

$$f_a = \frac{1}{Ta} = \frac{c + V \cos \theta}{L}$$

$$f_b = \frac{1}{Tb} = \frac{c - v \cos \theta}{L}$$

The difference $\Delta f$ between the frequencies $f_a$ and $f_b$ is as follows:

$$\Delta f = f_a - f_b = \frac{2v \cos \theta}{L}$$

From the above expression it may be apparent that the frequency difference $\Delta f$ is a function of only the flow velocity $v$ and hence the flow velocity $v$ can be obtained by measuring $\Delta f$. In this case, since the time interval during which the pulse propagates through the electric circuit system is very small as compared with that during which the pulse propagates through the water 2, the time interval in the electrical circuit is neglected.

With the prior art device shown in FIG. 1, since the periods Ta and Tb are different as may be seen from FIGS. 2A and 2B, even if the first pulses Pa and pb are emitted from the systems A and B at different times $t_1$ and $t'_1$, there will be a case when the pulses Pa and Pb are emitted at the same or approximately same time after the first emission of the pulses. In such a case, it becomes difficult to discriminate which of the pulses correspond to which of the systems A and B and hence there may be interference between the systems A and B.

Further, with the prior art the measurement is required to be made at a certain time interval, so that the response becomes slow.

SUMMARY OF THE INVENTION

Accordingly, it is an object of the present invention to provide an ultrasonic flow or current meter free from the defects encountered in the prior art.

It is another object of the invention to provide an ultrasonic flow or current meter which can accurately measure the velocity of liquid.

According to the invention, there is an ultrasonic flow or current meter in which a first ultrasonic sing-around system is connected to a pair of ultrasonic vibrators attached to a pipe through which liquid to be measured flows, a second ultrasonic sing-around system is also connected to the pair of ultrasonic vibrators, and the second ultrasonic sing-around system transmits an ultrasonic pulse in the direction opposite to that of the first ultrasonic sing-around system. In this case, the phases of the ultrasonic pulses from the first and second systems are detected, and the delayed amount of the pulse in one of the systems is controlled by the detected output signal to be constant, whereby the velocity of the liquid flowing through the pipe is measured.

The additional and other objects, features and advantages of the invention will become apparent from the following description taken in conjunction with the accompanying drawing.

BRIEF DESCRIPTION OF THE DRAWING

FIG. 1 is a schematic diagram showing the prior art ultrasonic flow or current meter;

FIGS. 2A and 2B are waveform diagrams used for explaining the operation of the meter shown in FIG. 1, respectively;

FIG. 3 is a schematic diagram showing an embodiment of the ultrasonic flow or current meter according to the present invention; and FIGS. 4A, 4B and 4C are waveform diagrams used for explaining the operation of the meter of the invention shown in FIG. 3.

DESCRIPTION OF THE PREFERRED EMBODIMENT

An embodiment of the present invention will be now described with reference to FIG. 3 and FIGS. 4A to 4C in which the same reference numerals and symbols as those used in FIGS. 1, 2A and 2B indicate the same elements and so on, so that their detailed description will be omitted for the sake of brevity.

In the embodiment of the invention shown in FIG. 3, the ultrasonic pulses $Pa$ and $Pb$ from both the systems A and B or transceivers $5a$ and $5b$ are applied to a phase comparator 8 which compares the phases of the pulses $Pa$ and $Pb$ and produces a compared output signal W, as shown in FIG. 4C. The output signal W is applied to an integration circuit 9 which produces an integrated voltage or mean voltage V shown in FIG. 4C by a dotted line 10. In this case, the amplitude E of the output signal W from the comparator 8 is always held constant, its width $t_p$ is changed in accordance with the interval between the pulses $Pa$ and $Pb$, and the integrated voltage V is changed with the interval. A so-called RS-flip-flop may be used as the phase comparator 8 which is driven by the pulse $Pa$ as a set pulse and by the pulse $Pb$ as a reset pulse, respectively. As a result, the integrated voltage V can be expressed as follows:

$$V = E \frac{t_p}{Ta}$$

In the present invention, a reference (constant) voltage source 11 and a differential amplifier 12 are provided. The differential amplifier 12 is supplied with a reference voltage $V_R$ from the reference voltage source 11 and with the integrated voltage V from the integration circuit 9 and produces a difference voltage $V_C$ ($V_C = G(V - V_R)$) where G represents the gain of the differential amplifier 12. The difference voltage $V_C$ is applied to a period control circuit 13 as a control voltage. The output signal from the control circuit 13 is applied to one of the transceivers $5a$ and $5b$ of the systems A and B, for example, to the transceiver $5b$ of the system B in the illustrated embodiment to control the propagating time period of the pulse $Pb$ therethrough, or to control the time at when the pulse $Pb$ is emitted from the output terminal $6b$ of the transceiver $5b$ with the result that the emitting time of the pulse $Pb$ is controlled to be constant relative to that of the pulse $Pa$.

In order to control the propagation time period of the pulse $Pb$ from the transceiver $5b$, it may be sufficient that a variable delay line or circuit (not shown) for the pulse $Pb$ is provided in the transceiver $5b$ and the variable delay line is controlled by the voltage $V_C$ from the period control circuit 13. In practice, semi-fixed delay circuits (not shown) are provided in the transceivers $5a$ and $5b$, respectively, the pulses $Pa$ and $Pb$ of the systems A and B are emitted in the same direction, respectively, by operating a switch 14, and the semi-fixed delay circuits provided in the transceivers $5a$ and $5b$ are adjusted, respectively, to select the periods $Ta$ and $Tb$ equal to each other ($Ta = Tb$).

If the condition $c >> v$ is assumed in the system A, the period $Ta$ can be expressed as follows:

$$Ta = \frac{L}{c + v \cos\theta} + t_a = \frac{L}{c} - \frac{L \cos\theta}{c^2} v + t_a = t_0 - \frac{\Delta t}{2} + t_a$$

In system B, the period $Tb$ can be expressed similarly as follows:

$$Tb = \frac{L}{c - v \cos\theta} + t_b + t_c = \frac{L}{c} + \frac{L \cos\theta}{c^2} v + t_b + t_c$$

$$= t_0 + \frac{\Delta t}{2} + t_b + t_c$$

where $t_0 = \frac{L}{c}$ ; $\Delta t = \frac{2L \cos\theta}{c^2} v$;

$t_a$ and $t_b$ represent the delay time periods of the pulses $Pa$ and $Pb$ by the semi-fixed delay circuits in the transceivers $5a$ and $5b$; and $t_c$ the delay time period of the pulse $Pb$ by the variable delay circuit in the transceiver $5b$, respectively.

In general, the control voltage $V_C$ and the controlled delay time interval $t_c$ have a linear relationship, and accordingly $t_c = kV_C$ where k corresponds to the control sensitivity of the period control circuit 13. With the construction described above, $Ta = Tb$ is achieved by the control voltage $V_C$, so that the control voltage $V_C$ and the width $t_p$ of the output voltage W are expressed as follows:

$$V_C = \frac{\Delta t + t_b - t_a}{k}$$

$$t_p = \frac{Ta}{E} \left( V_R + \frac{V_C}{G} \right)$$

Thus, if $t_a = t_b$ are obtained at the initial adjustment, the control voltage $V_C$ is expressed by the following expression.

$$V_C = \frac{\Delta t}{k} = \frac{2L \cos\theta}{c^2 k} v$$

From the above expression, it will be apparent that the control voltage $V_C$ is proportional to the flow velocity v of the water 2. Thus, with the present invention, the control voltage $V_C$ can be shown on a volt-meter (not shown) to indicate the flow velocity v of the water 2.

The above description is given for the case where the device operates stationary. However, immediately after electric power is applied to the device or when the device is disturbed in operation by some discontinuity, the phase relationship between the pulses of the systems A and B can not normally be maintained. In such a case, the phase of the pulse $Pb$ in the sing-around system B is controlled by a signal from the sing-around system A, which operates normally, through a starting circuit 15. In this case, it is assumed that the sing-around frequencies of both the systems A and B are equal and the phase difference therebetween is very close to that of the stationary state. When the whole system has substantially reached the stationary state, a relay (not shown) in the starting circuit 15 operates to make the system B perform the proper operation independently. In practice, the time interval is previously determined by the circuit constants. The operation of the device can be reliably brought to normal with the above process.

It is desirable to provide a sound velocity correction device in connection with the device. In fact, the device of the invention provides a sing-around system suitable for measuring sound velocity, so that correction can be easily achieved.

An embodiment of the sound velocity correction device will be described now. At first, a DC output, which may be proportional to the sing-around frequency or sound velocity in the system A is prepared. The sing-around operation in the system A is somewhat different depending upon whether the liquid flows, but the difference can be neglected in practice. That is, the flow velocity of the water 2 is at most about 0.1% of the sound velocity is the water 2. In any case, the DC voltage in proportional to $c^2$ ($c$ being the sound velocity in the water) and is obtained based upon the sing-around operation of the system A, and the thus obtained DC voltage is applied to a sound velocity correction circuit 16 together with the control voltage $V_C$ for calculations. Thus, the sound velocity correction circuit 16 produces an output corresponding to a correct water velocity $v$.

If the control voltage $V_C$ is zero when the water velocity is zero, the measurement is possible only in the case when the water is flowing in only one direction. However, if the value of the control voltage $V_C$ is selected to be not zero but a suitable value, the measurement can be also possible for the water flowing in the counter direction.

When the flow velocity of the water in the pipe is measured, its flow amount can be easily obtained, because the cross-sectional area of the pipe can be easily measured or could have been previously measured.

With the present invention, it will be obvious to provide a so-called calorimeter because the temperature of water can be measured based upon the sound velocity in the water and the heat in the water is measured in accordance with the temperature of the water and the amount of flow.

The above description is given for the preferred embodiment of the invention, but it may be apparent that many modifications and variations could be effected without departing from the spirits and scope of the novel concepts of the present invention.

We claim as our invention:

1. An ultrasonic flow or current meter comprising
   a pair of ultrasonic vibrators mounted on a pipe through which liquid to be measured flows;
   a first ultrasonic sing-around system connected to said pair of ultrasonic vibrators which propagates a train of ultrasonic pulses through said liquid in one direction with respect to flow direction of said liquid;
   a second ultrasonic sing-around system including a variable time delay circuit connected to said pair of ultrasonic vibrators which propogates a train of ultrasonic pulses through said liquid in the direction opposite to that of said first-mentioned ultrasonic pulses of said first ultrasonic sing-around system;
   phase detecting means for detecting the phase difference between said ultrasonic pulses in said first and second systems and producing a detected output signal in response to said phase difference;
   a control means connected to said second ultrasonic sing-around system to control the variable time delay circuit and said ultrasonic pulses in said second system so that the sing-around periods of said first and second sing-around systems are substantially the same at all times based on the detected output signal from said detecting means;
   a converting means receiving the output of said phase detecting means and supplying an output to said control means; and
   a flow velocity means connected to the output of said converting means and for producing an indication of the flow velocity of said liquid.

* * * * *